United States Patent
Lunzer

(10) Patent No.: US 7,226,004 B2
(45) Date of Patent: Jun. 5, 2007

(54) SOLVENT RESISTANT BEARINGS FOR SELF-GENERATING ELECTROSTATIC SPRAY GUN

(75) Inventor: Lawrence J. Lunzer, St. Louis Park, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 10/477,566

(22) PCT Filed: May 16, 2002

(86) PCT No.: PCT/US02/15925

§ 371 (c)(1),
(2), (4) Date: Apr. 19, 2004

(87) PCT Pub. No.: WO02/092239

PCT Pub. Date: Nov. 29, 2002

(65) Prior Publication Data

US 2004/0195404 A1 Oct. 7, 2004

Related U.S. Application Data

(60) Provisional application No. 60/291,269, filed on May 16, 2001.

(51) Int. Cl.
B05B 5/00 (2006.01)

(52) U.S. Cl. .............. 239/690; 239/708; 384/101; 384/295; 384/462

(58) Field of Classification Search .............. 239/112, 239/690, 4, 708; 118/302; 384/100, 101, 384/107, 284, 295, 462, 463; 508/104, 106, 508/181, 182
See application file for complete search history.

(56) References Cited

U.S. PATENT DOCUMENTS

| 5,366,298 A | * | 11/1994 | Toshimitsu et al. ......... 384/107 |
| 5,939,363 A | * | 8/1999 | Toyota et al. ............... 508/106 |
| 5,971,617 A | * | 10/1999 | Woelki et al. .............. 384/295 |

* cited by examiner

Primary Examiner—Steven J. Ganey
(74) Attorney, Agent, or Firm—Douglas B. Farrow

(57) ABSTRACT

An electrostatic spray gun (10) having an air powered alternator-turbine (14) with a rotating impeller (24) therein mounted in bearings (18) is provided with bearings (18) which are coated with a solvent resistant material. This coating is provided on all surfaces of the bearing (18) except for the inner diameter (18A) which contains the impeller (24). This construction prevents leaching of the oil out of the bearing (18) and into the airstream and also is resistant to paint should the spray gun (10) become immersed in such.

4 Claims, 1 Drawing Sheet

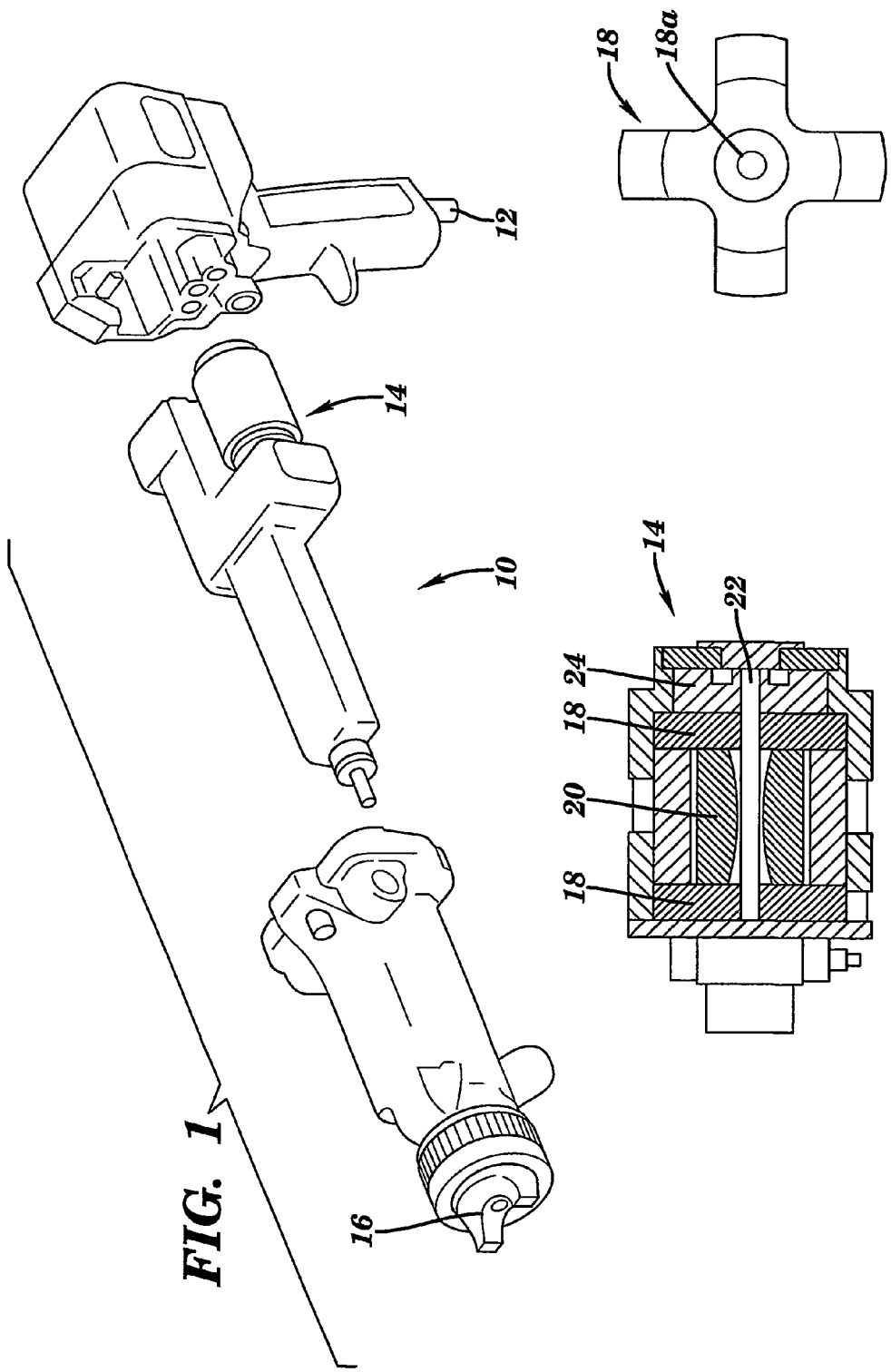

SOLVENT RESISTANT BEARINGS FOR SELF-GENERATING ELECTROSTATIC SPRAY GUN

This application is a 371 of PCT/US02/15925, filed May 16, 2002, which claims benefit of U.S. Provisional Application No. 60/291,269, filed May 16, 2001.

TECHNICAL FIELD

Electrostatic spray guns are well known for use in applying paints and other coatings where high transfer efficiency is preferred.

BACKGROUND ART

Electrostatic spray guns having self-contained power supplies such as shown in U.S. Pat. Nos. 4,554,622, 4,462,061, 4,290,091, 4,377,838 and 4,491,276 are well known. Such applicators have an air-powered turbine which drives an alternator which in turn supplies a voltage multiplier to provide the charging voltage.

In such products, the bearings are used to hold and allow a magnet to rotate on its shaft. In normal operation, air is passed over an internal impeller causing the magnet to rotate and such rotation inside a coil of wire provides electrical power for the applicator. This air is then exhausted through a separated air passage to the outside of the applicator. Such placement of the bearings inside the applicator allow the passage of air over and around the bearings to remove slight amounts of lubricant from the bearings. Because of this lubricant, this exhaust air must be separated from the air that is used to atomize the paint in order to prevent contamination with the bearing lubricant.

During cleaning of the applicator with solvents, such liquid solvents can flow into the bearings through the air passages, causing the solvents to remove the lubricant from the bearings subsequently leading to bearing failure. Also, if the air cap was not properly tightened, paint can flow backwards in the applicator filling the alternator air passages and the bearings with paint thereby forcing the alternator to be removed and replaced.

DISCLOSURE OF THE INVENTION

It is the purpose of this invention to remove the aforementioned causes of failure and extend bearing life.

Such bearings are made by pressing a bronze powdered metal into the bearing shape and then machining the pressing to its final dimensions. This process produces a porous metal shape which can hold liquid similar to a sponge. The bearing is then placed in oil and a vacuum is drawn removing the air and replacing it with oil. The excess oil is then wiped off and the porous bearing material will retain the lubricating oil which acts as a lubricant for the shaft as it rotates inside the bearings inner diameter. Such self-lubricating bearings described above constitute a well-known prior art bearing often referred to as an OILITE bearing.

In the instant invention, the bearing surfaces are coated with a thin solvent resistant coating such as XYLAN fluoropolymer based coating material (in the preferred embodiment), an epoxy-based paint or a baked-on powder coating or other equivalent. The bearing is completely coated except for the inner diameter through which the shaft turns. The coating is cured properly and the bearings are then placed into the container of lubricating oil and a vacuum is drawn removing the air, thus filling the porous bearings through the exposed inner diameter.

This result provides a minimum of exposed area (the inner diameter) thereby minimizing the removal of lubrication oil and the entering of contaminates. This process provides an increased bearing life and a greater ability to survive if the bearing should come in contact with solvent or paint contamination. This also allows the customer to reuse the current bearing when and if it comes in contact with paint or solvents by simply cleaning up the coated area. If needed, the customer can add a small amount of additional oil to the inner diameter before reuse. Such bearing coating can prevent the air from blowing out small amounts of lubricant imbedded in the bearing as it passes over it. This eliminates the need for an additional exhaust opening in the applicator and allows the air used to power the alternator to be used for paint atomization. This can thus result in a savings in air consumption and simply construction of internal air passages resulting in a smaller and lighter product.

These and other objects and advantages of the invention will appear more fully from the following description made in conjunction with the accompanying drawings wherein like reference characters refer to the same or similar parts throughout the several views.

BRIEF DESCRIPTION OF DRAWINGS

FIG. 1 is an exploded view of an electrostatic spray gun utilized in the instant invention.

FIG. 2 is a cross section of the alternator assembly utilized in the instant invention.

FIG. 3 is a front view of the bearing utilized in the instant invention.

BEST MODE FOR CARRYING OUT THE INVENTION

In the instant invention shown broadly in FIG. 1, an electrostatic gun, generally designated 10 has an inlet air passage 12, an alternator turbine assembly 14 and an air cap 16. Alternator assembly 14 is shown in more detail in FIG. 2, and is comprised of bearings 18, magnet 20 mounted on shaft 22, and impeller 24 mounted on shaft 22. Bearings 18 are shown in detail in FIG. 3 and are coated with XYLAN fluoropolymer based coating material (in the preferred embodiment), an epoxy-based paint or baked on powder coating except for the inner diameter 18A which is left uncoated.

After a curing of the coating, the bearings are placed in a container of lubricating oil and a vacuum drawn, thereby removing the air from the porous bearings and allowing the oil to penetrate the bearing for later use.

It is contemplated that various changes and modifications may be made to the bearing assembly without departing from the spirit and scope of the invention as defined by the following claims.

The invention claimed is:

1. In an electrostatic spray gun 10 having a self-contained power supply wherein said power supply comprises an alternator turbine set 14, said turbine having an air-driven impeller 24 mounted in at least one bearing 18 exposed to an air stream, said bearing 18 comprising first and second ends and a load bearing internal diameter 18A in which part of said impeller 24 is rotatably located, the improvement comprising coating said bearing with a solvent resistant coating, said coating completely covering said bearing including said ends except for said load bearing internal diameter 18A.

2. The electrostatic spray gun of claim 1 wherein said coating comprises a fluoropolymer based material.

3. The electrostatic spray gun of claim 1 wherein said bearing 18 is comprised of a porous bronze material.

4. The electrostatic spray gun of claim 3 wherein said bearing 18 comprises a lubricant therein.

* * * * *